UNITED STATES PATENT OFFICE.

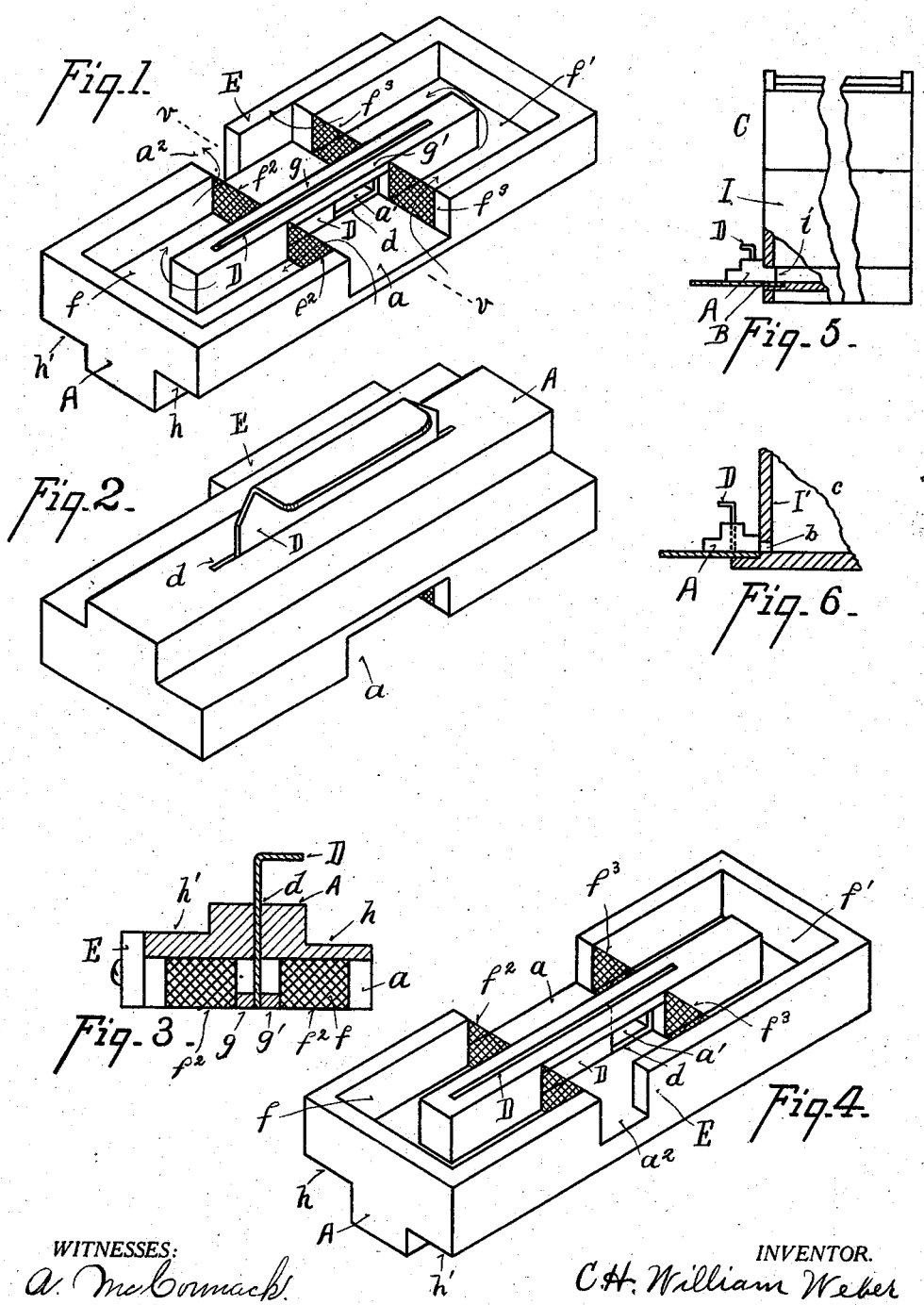

CHARLES H. WILLIAM WEBER, OF CINCINNATI, OHIO.

BEEHIVE.

No. 866,991.  Specification of Letters Patent.  Patented Sept. 24, 1907.

Application filed March 30, 1907. Serial No. 365,457.

*To all whom it may concern:*

Be it known that I, CHARLES H. WILLIAM WEBER, a citizen of the United States, residing at Cincinnati, in the county of Hamilton and State of Ohio, have invented certain new and useful Improvements in Controllers for Beehives, of which the following is a specification.

My invention relates to improvements in bee hives. One of its objects is to provide means by which the light may be excluded from the hive and the hive supplied with the requisite amount of fresh air at all times, and the bee exit may be either opened or closed at will, either with or without the admission of light.

Another object is to provide means for varying the size of the exit, both vertically and laterally, to meet the requirements of the particular hive, season, and the number of bees passing in and out, and also so that in case the hive is attacked by robber bees, the exit may be so reduced that the bees within are fully able to defend their portal.

Another object is to so proportion and arrange my improvements into an attachment which can be attached and removed at will, and which is applicable to any of the various styles of hives in common use.

It further consists in certain details of form, combination and arrangement, all of which will be more fully set forth in the description of the accompanying drawings, in which;

Figure 1 is a perspective view of the bottom or under side of the preferred form of my improvement; Fig. 2 is a perspective view of the upper side of the same. Fig. 3 is a section on line $v$—$v$ Fig. 1. Fig. 4 is a view similar to Fig. 1, showing a modification. Fig. 5 is a side elevation, partly in section of one style of hive showing my improvement attached thereto. Fig. 6 is a detailed sectional view of the exit of another style of hive, with my improvements attached thereto.

When the sun shines, the bees are attracted by the light entering the ordinary hive exit and induced thereby to go outside even on cold days in the winter and spring, and thus many of them become chilled and unable to return to the hive and the number of bees or strength of the hive is in this way greatly reduced.

In order to maintain a supply of fresh air in the hive and yet be able to exclude the light, so that the bees will not crowd to and block the air passages in seeking an exit, and, if desired, to close the exit, I provide a channeled vestibule, A, which may be fitted into the ordinary exit, or portal, B, of a hive, C, as shown in Fig. 5, or which may be fitted close against the face of the hive to close exit, $b$, of the hive, $c$, as shown in Fig. 6.

The vestibule, A, has a channel or passage, $a$, through which, when open, the bees may pass to the outside, but which can be partly or wholly closed by means of a slide or shutter, D, which seats in a slot, $d$. The slot, $d$, is longer than the slide, D, or the passage, $a$, so that the slide may be set so as to close only part of the passage, $a$, as shown in Fig. 1, or the slide may be set entirely across the passage, but only part of the depth of the passage, $a$, so as to leave a long but narrow channel, or the passage $a$, may be entirely closed by the slide, D. I preferably set the slide, D, so as to leave a short opening, $a'$, at one side of passage, $a$, and employ a plate, or extension, E, opposite the opening, $a'$, leaving an opening, $a^2$, between the extension, E, and opposite side of the channel, $a$. When thus set the light is intercepted so as not to enter the hive through channel, $a$ and the major portion of the bees so long as it is dark in the hive, stay contentedly in the hive, while there is an opening through which such bees as may particularly desire to pass out, may do so. Should it be desired, however, the slide, D, may be arranged to completely cut off the channel, $a$, in which case, air is supplied to the hive through U-shaped channels, $f$, $f'$, which connect with channel, $a$, on opposite sides of slide, D. The entrances of channels, $f$, $f'$, are closed by wire screens, $f^2$, $f^3$, to prevent the bees entering the channels, $f$, $f'$. The strips, $g$, $g'$, at the bottom of channel, $a$ on opposite sides of slide, D, prevent the passage of light under the lower edge of the slide.

As shown in Fig. 1, the extension, E, may be either permanently or temporarily attached and may be adjustable to give a wider or narrower opening. As shown in Fig. 4 it is permanent, being formed integral with the side wall of the vestibule. Vestibule, A, is recessed on top to provide reduced sections, $h$, $h'$, the recess being deeper on one side than the other, so that one reduced section, $h$, will enter and closely fit the entrance $i$ of one style of hive I, while section, $h'$, will enter and closely fit another style of hive, as indicated in Fig. 5. With other styles of hives, the vestibule is fitted across and close against the face of the hive, as indicated in Fig. 6.

As my improvements are only required to be in use in cold weather and in case of attack by robbers, I prefer to embody all the features in a vestibule or attachment, which can be readily attached when required, and removed when not required.

The device herein specified is capable of considerable modification, without departing from the principle of my invention.

Having described my invention, what I claim is:

1. In combination, with a bee hive, a vestibule adapted to be affixed with a light excluding connection to the portal of the hive, said vestibule being provided with passages of different widths at opposite sides, and an adjustable slide adjustable to admit or exclude light without closing the opening, and strips at the bottom of said channel at opposite sides of said slide.

2. In combination with a bee hive, a vestibule adapted to be affixed with a light excluding connection to the portal of the hive, said vestibule being provided with a screened circuitous air channel excluding light, leading to the hive, a channel for the passage of the bees to and from the hive, and a movable slide adapted to close said bee channel.

3. A vestibule having substantially vertical sides of different heights, a central rib of greater height than the sides to fit the face of the hive, said vestibule having a circuitous channel to form an exit and supply air, and at the same time to exclude light from the hive.

4. A vestibule having opposite sides of different heights, a central rib of greater height than the sides, said vestibule having openings of different widths at opposite sides, and an adjustable slide adjustable to exclude or admit light to the hive.

5. A vestibule adapted to be fitted with a light excluding connection to the portal of a hive, said vestibule being provided with a channel supplying air to the hive and serving as a passage for the bees to and from the hive, a slide adjustable relative to said vestibule to vary the size of said channel and to exclude the entrance of light through said channel, and strips at the bottom of said channel at opposite sides of said slide.

In testimony whereof I have affixed my signature in presence of two witnesses.

CHARLES H. WILLIAM WEBER.

Witnesses:
C. W. MILES,
WALTER I. MURRAY.